(12) United States Patent
Nishina et al.

(10) Patent No.: US 8,253,989 B2
(45) Date of Patent: Aug. 28, 2012

(54) OPTICAL READER, IMAGE READER AND IMAGE FORMING DEVICE

(75) Inventors: Kiichiro Nishina, Yokohama (JP);
Yasuo Sakurai, Yokohama (JP);
Nobuaki Ono, Yokohama (JP);
Masahiro Itoh, Sagamihara (JP)

(73) Assignee: Ricoh Company, Ltd., Tokyo (JP)

( * ) Notice: Subject to any disclaimer, the term of this patent is extended or adjusted under 35 U.S.C. 154(b) by 535 days.

(21) Appl. No.: 12/503,206

(22) Filed: Jul. 15, 2009

(65) Prior Publication Data
US 2010/0027079 A1 Feb. 4, 2010

(30) Foreign Application Priority Data

Jul. 30, 2008 (JP) ................................. 2008-197075

(51) Int. Cl.
*H04N 1/04* (2006.01)
(52) U.S. Cl. ......... 358/474; 358/475; 358/497; 358/498
(58) Field of Classification Search .................. 358/474, 358/475, 497, 498, 509
See application file for complete search history.

(56) References Cited

U.S. PATENT DOCUMENTS

| | | | |
|---|---|---|---|
| 4,638,987 A | 1/1987 | Sakurai | |
| 4,715,597 A | 12/1987 | Sakurai | |
| 5,124,837 A | 6/1992 | Ono | |
| 6,356,722 B1 * | 3/2002 | Kida | ............................... 399/92 |
| 7,209,702 B2 | 4/2007 | Kohchi et al. | |
| 7,330,692 B2 | 2/2008 | Kohchi et al. | |
| 7,438,443 B2 | 10/2008 | Tatsuno et al. | |
| 7,446,953 B2 | 11/2008 | Itoh et al. | |
| 2005/0063025 A1 * | 3/2005 | Hayashide | ..................... 358/497 |
| 2005/0088707 A1 | 4/2005 | Sakurai et al. | |
| 2006/0008295 A1 | 1/2006 | Kohchi et al. | |
| 2006/0187500 A1 | 8/2006 | Sakurai | |
| 2006/0197822 A1 * | 9/2006 | Sakurai | ........................ 347/118 |
| 2006/0279961 A1 | 12/2006 | Sakurai | |
| 2007/0216969 A1 * | 9/2007 | Nishina | ........................ 358/509 |
| 2007/0279712 A1 | 12/2007 | Nishina | |
| 2008/0063313 A1 | 3/2008 | Nishina | |
| 2008/0218724 A1 | 9/2008 | Nishina et al. | |
| 2008/0278779 A1 | 11/2008 | Nishina et al. | |

FOREIGN PATENT DOCUMENTS

| | | |
|---|---|---|
| JP | 10-032676 | 2/1998 |
| JP | 2002-142082 | 5/2002 |
| JP | 2004-157213 | 6/2004 |
| JP | 2005-27082 | 1/2005 |
| JP | 2005-241681 | 9/2005 |
| JP | 2006-042016 | 2/2006 |
| JP | 2006-67551 | 3/2006 |
| JP | 3979741 | 7/2007 |
| JP | 2008-116761 | 5/2008 |

* cited by examiner

*Primary Examiner* — Houshang Safaipour
(74) *Attorney, Agent, or Firm* — Dickstein Shapiro LLP

(57) ABSTRACT

An optical reader which reads image information on an original document by moving to the original document includes an illumination unit having at least one light source arranged on a substrate and illuminating the original document, a plurality of mirrors reflecting reflection light from the original document, a focusing lens focusing the reflection light from the original document reflected by the mirrors, and a photoelectric conversion element arranged in a focusing position of the focusing lens, a normal direction of an emission surface of the light source and a normal direction of a light-receiving surface of the photoelectric conversion element are the same direction, an original document reading position is set near an end portion of the optical reader in the normal direction.

14 Claims, 10 Drawing Sheets

OPTICAL READER, IMAGE READER AND IMAGE FORMING DEVICE

PRIORITY CLAIM

The present application is based on and claims priority from Japanese Patent Application No. 2008-197075, filed on Jul. 30, 2008, the disclosure of which is hereby incorporated in its entirety.

BACKGROUND OF THE INVENTION

1. Field of the Invention

The present invention relates to an optical reader which reads information on an original document by focusing an image on the original document to a photoelectric conversion element such as an image sensor with a focusing optical system, in particular, to an optical reader, which is suitable for a digital image reader, a digital copier and the like, and is developed in connection with an illumination unit illuminating an original document upon reading, an image reader, and an image forming device.

2. Description of the Related Art

FIG. 10 illustrates one example of a general image reader. In the image reader illustrated in FIG. 10, an original document 2 on which an image to be read is depicted is placed on a contact glass 1 of a flat platen. An illumination unit 3 is disposed under the contact glass 1. The illumination unit 3 includes a cylindrical lamp 3A, which extends in the direction orthogonal to FIG. 10, such as a slender xenon lamp or a halogen lamp, and a slender band-like reflector 3B, which reflects light from the lamp 3A, and condenses the light in the direction orthogonal to FIG. 10. This illumination unit 3 illuminates a long band-like portion of the original document 2 in the direction orthogonal to FIG. 10.

In this case, the light reflected by the illuminated portion of the original document 2 with an image is sequentially reflected by five reflection mirrors in order from M1 to M5. A reduced image on the original document 2 is focused on an imaging area of a line sensor 6 as a photoelectric conversion element. The illumination unit 3, the reflection mirrors M1-M5, an image reading lens 5 and the line sensor 6 constitute one unit as an optical reader 7. This optical reader 7 drives in the arrow direction (right side in FIG. 10) by a driving unit (not shown), so as to be displaced to a position illustrated by the dotted lines. The entire information on the original document 2 is thereby read.

The line sensor 6 which images the image on the original document 2 is a three-line color sensor such as a three-line CCD image sensor in which photoelectric conversion elements 6A, 6B, 6C each having R (red), G (green) and B (blue) filters as a color separation section are arranged in three lines on one chip. The line sensor 6 which is the three-line color sensor converts the image on the original document 2 into signals according to the illumination scanning of the original document 2. The color image of the original document 2 is thereby separated into three colors, R, G, B, to be read.

When an image reader uses this optical reader 7, the color separation section (for example, R, G and B filters provided in the photoelectric conversion elements 6A, 6B, 6C) is disposed in the focusing optical path of the image reading lens 5. Therefore, a full-color image can be read.

In addition, as a color separation method, a method of separating into respective colors, R, G, B by selectively inserting a color separation prism or a filter between the image reading lens 5 and the line sensor 6, and a method of separating into respective colors by illuminating the original document 2 by sequentially lighting respective light sources of R, G, B can be used, in addition to a method of using the photoelectric conversion elements 6A, 6B, 6C each having R, G and B filters.

There may be a case which reads information on an original document as a monochrome image without disposing a color separation section in a focusing optical path.

In this case, the five reflection mirrors M1-M5 are used, but the number of reflection mirrors is not limited to five.

FIG. 11 illustrates one example of an image forming device having the optical reader 7. The image forming device illustrated in FIG. 11 includes an image reader 200 disposed in the upper portion of the image forming device, and an image forming unit disposed under the image reader 200. The image reader 200 includes the optical reader 7 illustrated in FIG. 10. The reference numbers used in FIG. 10 are also used for the portions in FIG. 11 corresponding to the portions in FIG. 10.

The image signals output from the three-line sensor 6 of R, G, B which is an imaging section of the image reader 200 are sent to an image processor 120 of the image forming unit, and are processed in the image processor 120. In this case, these signals are converted into signals for writing an electrostatic latent image on a photoreceptor by each color, yellow (Y), magenta (M), cyan (C), and black (K).

The image forming unit includes a cylindrical photoreceptor 1100 as an electrostatic latent image carrier. The photoreceptor 1100 includes therearound a charging roller 1110 as a charging section, a turret-type developer 130, a transfer belt 1140 and a cleaner 1150. As the charging section, a corona charger can be used instead of the charging roller 1110.

An optical scanner 1170 receives the writing signals from the image processor 1200, and an electrostatic latent image is written on the photoreceptor 1100 by the scanning of an optical beam. In this case, the optical scanner 1170 writes an electrostatic latent image on the outer circumference face of the photoreceptor 1100 between the charging roller 1110 and the developer 1130.

The image forming unit of the image forming device includes the lower portion thereof a fusing unit 1160, a cassette 1180, a resistor roller pair 1190, a paper feeding roller 1220 and a tray 1201. A path for transfer paper S as recording media is formed under the photoreceptor 1100.

When forming an image, the photoreceptor 1110 rotates at a constant speed in the clockwise direction in FIG. 11, and the outer circumference surface of the photoreceptor 1100 is uniformly charged by the charging roller 1110. The outer circumference surface of the photoreceptor 1100 is exposed by the light beam emitted from the optical scanner 1170, and an electrostatic latent image is formed on the outer circumference surface of the photoreceptor 1100. The formed electrostatic latent image is a so-called negative latent image in which an image portion is exposed.

The writing of the electrostatic latent image is conduced in order from a yellow (Y) image, a magenta (M) image, a cyan (C) image and a black (K) image according to the rotation of the photoreceptor 1100. The electrostatic latent image formed on the outer circumference surface of the photoreceptor 1100 is reversely-developed by each developer unit Y, M, C, K of a turret-type developer station 1130 such as a cylinder in a revolver, more particularly, a Y developer unit which develops by yellow toner, a M developer unit which develops by magenta (M) toner, a C developer unit which develops by cyan toner, and a K developer unit which develops by black (K) toner, so as to be visualized as a positive image. The toner image of each color formed on the outer circumference surface of the photoreceptor 1100 is sequentially transferred on the transfer belt 1140 by a transfer voltage application roller 114A. A color image in which the above toner image of each color is overlapped on the transfer belt 1140 is then obtained.

The cassette 1180 in which transfer paper S is housed is detachably attached to the body of the image forming device. In a state in which the cassette 1180 is attached to the image forming device as illustrated in FIG. 11, the top sheet of the transfer paper S housed in the cassette 1180 is fed to a paper feeding path by the paper feeding roller 1220, and the leading end portion of the sheet is caught by the resist roller pair 1190.

The resist roller pair 1190 sends the transfer sheet S to the transfer unit in a timing in which the color image formed on the transfer belt 1140 moves to the transfer position. The transfer sheet S fed to the transfer unit is overlapped to the color image in the transfer unit, and is pressed to the color image by the transfer roller 114B. The color image is thereby electrostatically transferred onto the transfer paper S.

The transfer sheet S onto which the color image is transferred is sent to the fusing unit 1160, so that the color image is fused. Then, the transfer sheet S is guided by a guide unit (not shown) which guides the transfer sheet S, is moved on the transfer path, and is discharged on the tray 1210 by a paper discharging roller pair (not shown).

The outer circumference surface of the photoreceptor 1100 is cleaned by the cleaning unit 1150 every time the toner image of each color is transferred, so that the residual toner, paper power and the like are eliminated.

When forming a monochrome image without forming a full-color image, a known image forming unit for a single color image is used instead of the above image forming unit.

A cylindrical lamp such as a xenon lamp or a halogen lamp generally for use in the illumination unit of the optical reader 7 illustrated in FIG. 10 has large power consumption and also large heat generation, so that the temperature in the entire device is increased. In the image reader using the optical reader including the illumination unit, the imaging optical system, and the photoelectric conversion element as one unit illustrated in FIG. 10, since the sealing performance of the optical reader is high, the increase in the temperature in the optical reader 7 becomes larger by the heat generation of the cylindrical lamp in the illumination unit. If the increase in the temperature in the optical reader 7 becomes large by the heat generation of the cylindrical lamp in the illumination unit, the conjugate relation of the optical system is disturbed, and the focusing is not conducted to the photoelectric conversion element (an image is not focused onto the photoelectric conversion element). Consequently, a preferable image is not obtained.

In order to downsize the image reader, a cold cathode fluorescent lamp (hereinafter, referred to as a CCFL) is often used instead of using the above xenon lamp or halogen lamp. The CCFL requires time to stabilize the illumination amount, so that it takes a long preparation time for reading an original document. The CCFL contains mercury (Hg) having a problem from an environmental aspect regarding recycling and the like.

For this reason, an illumination unit using an LED (light-emitting diode) light source, which has low power consumption, small heat generation, and a long operating life, and an advantage from an environment aspect regarding recycling and the like, has attracted attention as a new illumination light source instead of the above lamps.

As the above illumination unit using an LED, an illumination unit in which LEDs are arranged at given intervals is disclosed in Patent Document 1 (JP2006-67551A), Patent Document 2 (JP2004-157213A), Patent Document 3 (JP2005-27082A), Patent Document 4 (JP2002-142082A), Patent Document 5 (JP2005-241681A), and Patent Document 6 (JP2006-42016A).

For example, in Patent Document 1, a method of effectively illuminating a surface of an original document by controlling the spread of the light in the arrangement direction of the LEDs in one illumination unit is disclosed. In Patent Document 1, a method of reducing uneven illumination according to the arrangement of the LEDs when arranging the LEDs is disclosed, but this method illuminates an original document only at a certain angle.

In general, when reading an original document having a gap in the direction orthogonal to the scanning direction of an illumination unit (i.e., scanning direction of original document) as a cut-and-paste original document in which a cut original document is pasted to another original document by bond or the like, for example, shadow is created by the light blocked by the gap. Therefore, it is known that an abnormal image is obtained, which generates a black shadow line in the read original information. It is also known that a phenomenon similar to that in the above cut-and-paste original document occurs in the boundary face between the original document and a plate which presses the original document in the end portion of the original document.

As a method of reducing such a phenomenon, it is effective to illuminate an original document from another direction as described in Patent Document 1. However, this method requires at least two illumination units. In addition, a certain length of a light source of the illumination unit is required in order to reduce the uneven illumination. For this reason, as illustrated in FIG. 12, the measurement h1 in the height direction of the illumination unit is increased, so that a space which can not be used for deflecting luminous flux by means of the reflection mirrors in the optical reader 7, i.e., a dead space is increased in size. As a result, the height H and the width W of the optical reader 7 are increased, resulting in the increase in the power consumption and the costs of the device. In order to effectively illuminate, it is necessary to ensure a regular distance from the LED of the illumination light source to the surface of the original document or more. Therefore, it is necessary to increase the size of the optical reader 7 in the normal direction of the surface of the original document.

In contrast, in Patent Documents 2, 3, 4, a method is disclosed of illuminating from the other side with the reflection light of mirrors disposed on the side opposite to the light source.

In the structure described in Patent Document 2, since the LED directly faces a side to be illuminated, the light volume to be reflected by the mirror is reduced. In this case, in the cut-and-paste original document in which the second original document is pasted on the first original document, the generation of the shadow is different between the illumination from the first original document side toward the second original document side and the illumination from the second original document side toward the first original document side. If the cut-and-paste original document is illuminated from one side, the shadow is easily generated compared with a case in which the cut-and-paste original document is illuminated from the other side. More particularly, if an original document includes a pasted portion, shadow is generated according to the direction of the illumination relative to a boundary division of the pasted portion.

In the structure described in Patent Document 3, an LED for direct illumination is disposed different from an LED for reflection illumination. Since a so-called shell-type LED is directly disposed, it is necessary for the illumination unit to be disposed close to the surface of the original document, in order to effectively illuminate the surface of the original document. When disposing the illumination unit close to the surface of the original document, uneven illumination according to the arrangement pitches of the LEDs easily occurs because of the angular dependency of the emission of the LEDs. Therefore, it is necessary to arrange the LEDs at narrow pitches even if a required illuminance is low. For this reason, the illumination efficiency is low.

The illumination unit described in Patent Document 4 has a structure which illuminates a surface of an original document by disposing two reflection planes each of which has a concave face on an LED side. In this structure, similar to the above structure in Patent Document 3, if the LEDs are arranged at wide pitches, uneven illumination in the arrangement direction according to the arrangement intervals of the LEDs occurs on the surface of the original document. Therefore, it is necessary to arrange the LEDs at narrow pitches. On the other hand, if the distance from the LEDs to the reflection plane is increased, the uneven illumination can be reduced. However, such a structure requires a large reflection plane, so that the size of the illumination unit has to be increased.

In addition, a structure which uses a halogen lamp as a light source, and disposes a reflection section for reflecting illumination light in the original document direction between the light source and the original reading surface is described in Patent Document 7 (JP3979741B).

In the structure of Patent Document 7, the halogen lamp is a cylindrical lamp, and the emission intensity of the projection light is even relative to the normal direction of the tube of the halogen lamp HL as illustrated in FIG. 13. For this reason, as illustrated in FIG. 14, if the illumination light is not reflected by reflection planes RS3, RS4 in an optical system around the halogen lamp HL, so as to be deflected, it is difficult for reflection planes RS1, RS2 each of which guides the illumination light to the surface of the original document to effectively guide the illumination light to the reading face of the original document, and the light use efficiency in the original document reading position is extremely deteriorated. In such an illumination optical system, the projection light from the halogen lamp HL is deteriorated in its light volume by the reflection with the peripheral reflection planes. Therefore, the heat generation amount (light volume) and the size of the optical system surrounding the halogen lamp (illumination unit size) have to be increased, in order to obtain sufficient light volume on the original document surface.

SUMMARY OF THE INVENTION

It is, therefore, an object of the present invention to provide an optical reader, an image reader and an image forming device, which control an abnormal image arising from a pasted portion in a cut-and-paste image and a gap in an end portion of an original document, have a reduced height and a reduced width, achieve downsizing and highly-efficient light use, reduce power consumption, and contribute energy saving and environmental conservation.

A first aspect of the present invention relates to an optical reader which reads image information on an original document by moving to the original document including: an illumination unit having at least one light source arranged on a substrate and illuminating the original document; a first mirror reflecting reflection light from the original document; a second mirror reflecting reflection light from the first mirror; a focusing lens focusing the reflection light from the original document reflected by the second mirror; and a photoelectric conversion element arranged in a focusing position of the focusing lens, wherein a normal direction of an emission surface of the light source and a normal direction of a light-receiving surface of the photoelectric conversion element are the same direction, an original document reading position is set near an end portion of the optical reader in the normal direction, a reflection section reflecting illumination light in a surface direction of the original document is disposed between the original document reading position and the end portion of the optical reader in the normal direction of the light emission surface of the light source, and an optical path from the first mirror to the second mirror has an angle relative to the normal direction of the emission surface of the light source.

Preferably, a normal line of the emission surface of the light source and an optical axis of the focusing lens are substantially parallel to each other.

Preferably, a diffusion control section controlling diffusion of the illumination light from the light source is disposed on both sides of the light source in an up and down direction orthogonal to the arrangement direction of the light source.

Preferably, the mirror guiding the reflection light from the surface of the original document is disposed between an optical path from the focusing lens to the photoelectric conversion element and the surface of the original document.

A second aspect of the present invention relates to an image reader, including: the above-described optical reader, wherein the original document is read by the optical reader.

Preferably, a color separation section having a color separation function is disposed in an arbitrary position in the optical path of the optical reader, and full-color information of the original document is read by using the color separation section.

A third aspect of the present invention relates to an image forming device, including: the above-described image reader according, wherein an image read by the image reader is formed.

BRIEF DESCRIPTION OF THE DRAWINGS

The accompanying drawings are included to provide further understanding of the invention, and are incorporated in and constitute a part of this specification. The drawings illustrate an embodiment of the invention and, together with the specification, serve to explain the principle of the invention.

DETAILED DESCRIPTION OF THE PREFERRED EMBODIMENT

Hereinafter, an embodiment of an optical reader, an image reader and an image forming device will be described with reference to the accompanying drawings.

Figure 1:
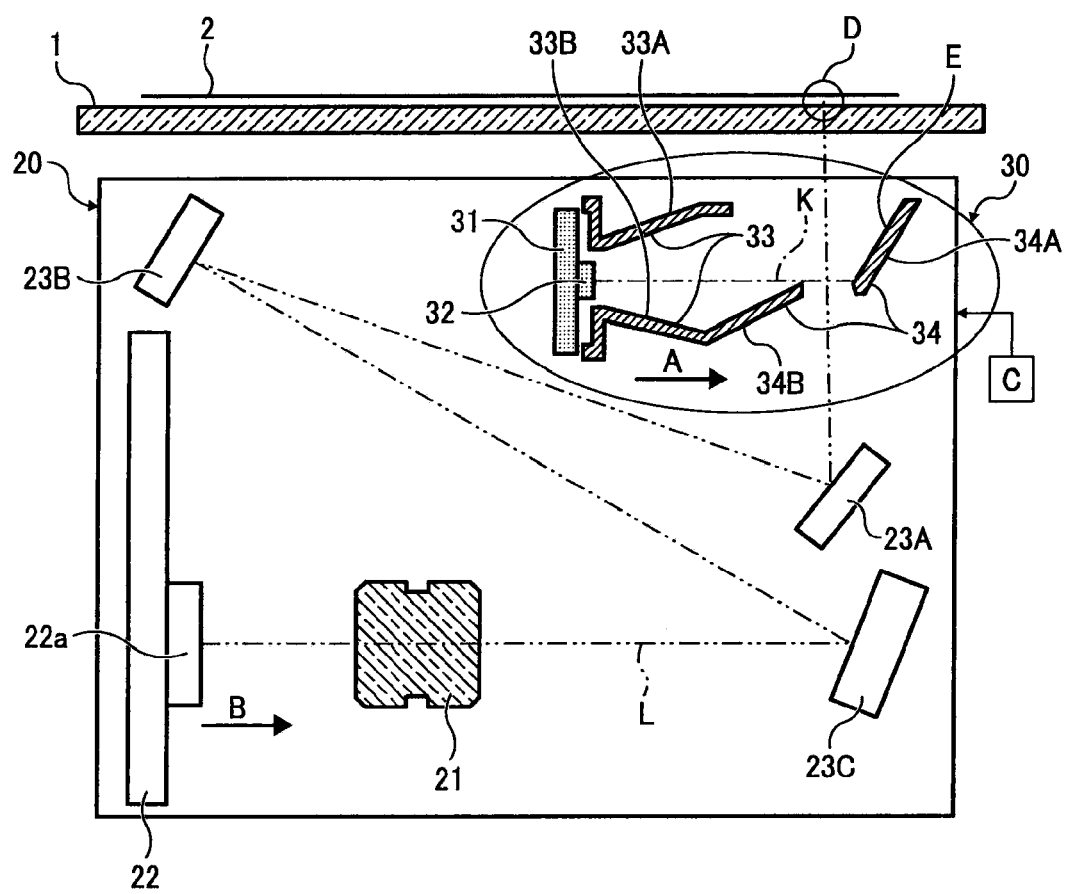
FIG. 1 provides a sectional view schematically illustrating a structure of an optical reader according to one embodiment of the present invention.
Figure 10:
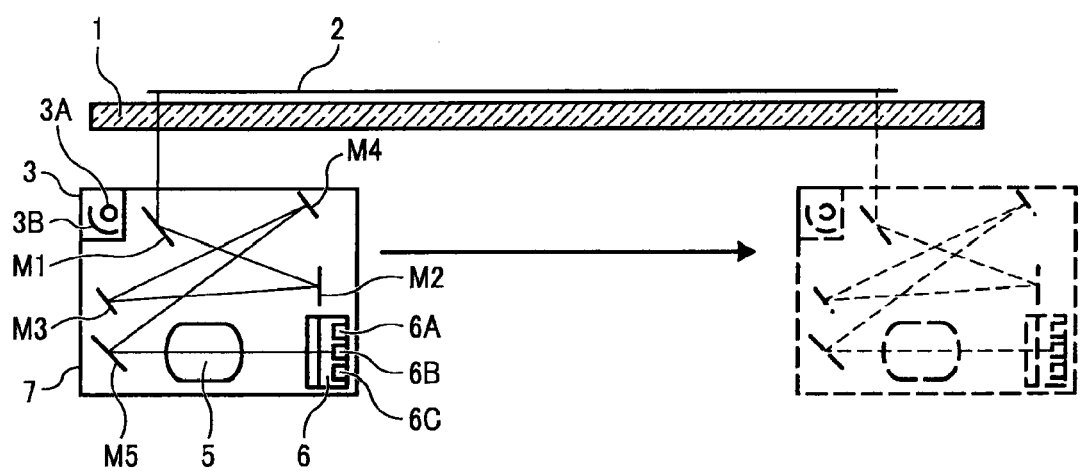
FIG. 10 provides a sectional view schematically illustrating one example a general structure of an image reader.

FIG. 1 provides a sectional view schematically illustrating a major structure of the optical reader according to the embodiment of the present invention. In FIG. 1, a portion having a function or a structure which is substantially the same as that in FIG. 10 has a reference number which is the same as that in FIG. 10, and the detailed description thereof will be omitted.

Referring to FIG. 1, an optical reader 20 includes a focusing lens 21, a photoelectric conversion element 22, a first reflection mirror 23A, a second reflection mirror 23B, a third reflection mirror 23C and an illumination unit 30. The illumination unit 30 includes a substrate 31, a light source 32, a divergent control section 33, and a reflection section 34. The divergent control section 33 includes a first divergent control part 33A and a second divergent control part 33B. The reflection section 34 includes a first reflection part 34A and a second reflection part 34B. A contact glass 1 as a platen is disposed over the illumination unit 30 in FIG. 1, similar to the structure in FIG. 10. An original document 2 is placed on this contact glass 1.

As illustrated in FIG. 1, the illumination unit 30 is disposed in the upper portion of the optical reader 20, and illuminates the original document 2 placed on the contact glass 1. The reflection light from the original document 2 illuminated by the illumination unit 30 is reflected, in order, by the first reflection mirror 23A, the second reflection mirror 23B, and the third reflection mirror 23C in which an optical path of the reflection light is deflected, and then is guided to the focusing lens 21. The focusing lens 21 reduces the reflection image of the original document 2 and focuses the reflection image on a light-receiving surface 22a of the photoelectric conversion element 22. The illumination unit 30 includes a plurality of light sources 32 arranged on the substrate 31. The direction A which is the emission direction of the light source 32 and the normal direction B of the light-receiving surface of the photoelectric conversion element 22 are the same. An original document reading position D is set near an end portion C of the optical reader 20 in the direction A (direction B). A reflection surface E of the reflection part 34A for reflecting illumination light in the original document surface direction is disposed between the original document reading position D and the end portion C. A normal line K of the emission surface of the light source 32 is substantially parallel to the optical axis L of the focusing lens 21.

Figure 8:
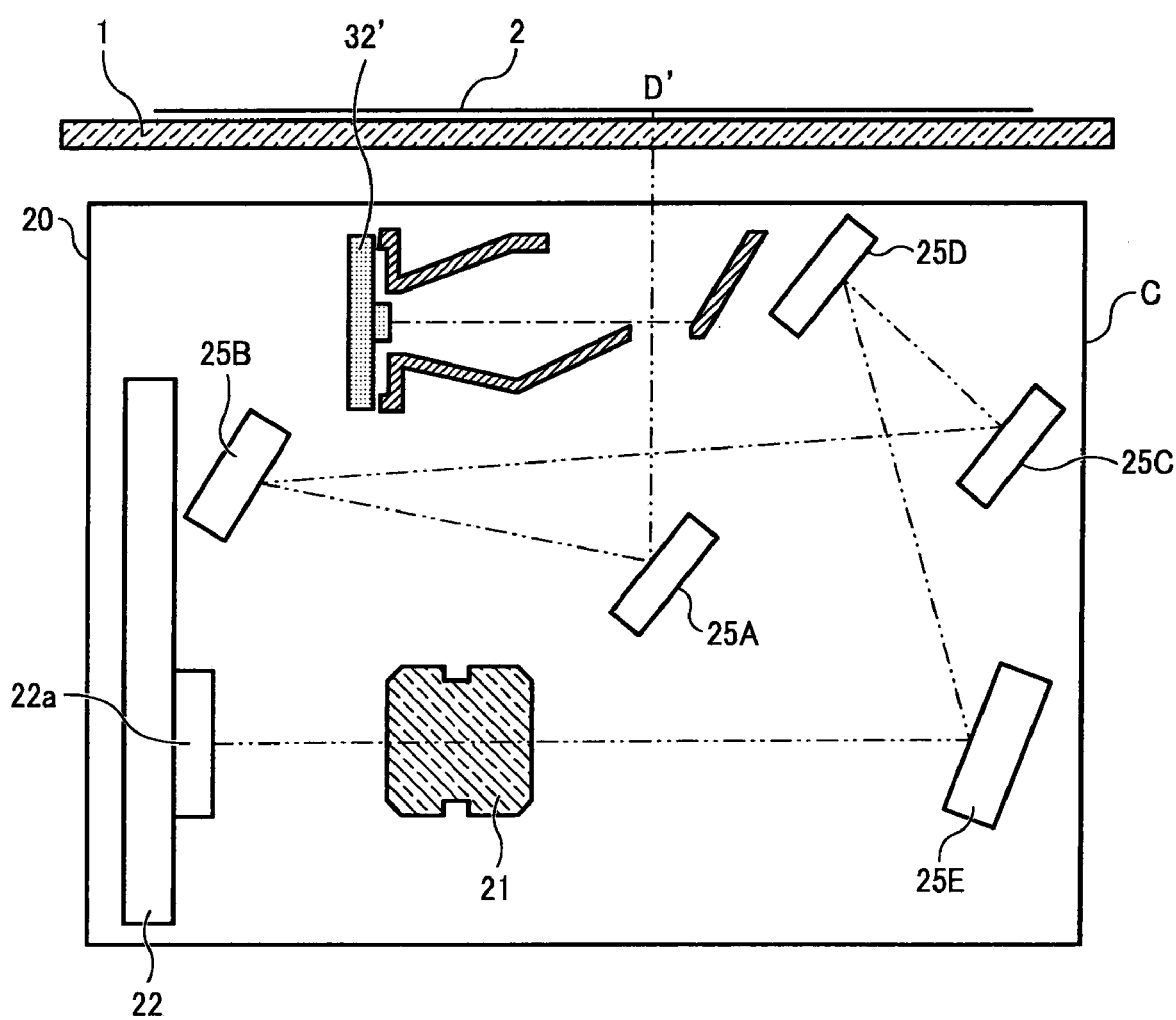
FIG. 8 provides a sectional view schematically illustrating one example of an unfavorable structure of an optical reader.

For instance, as illustrated in FIG. 8, if the original document reading position D is moved to the position D' near the central portion of the optical reader from the position D near the end portion C of the optical reader 20, the space between the original reading position D' and the end portion C of the optical reader is increased. In order to effectively use such a wide space, it is necessary to increase the number of reflection mirrors as illustrated in FIG. 8, for example, 5 reflection mirrors 25 (25A, 25B, 25C, 25D, 25E), which results in the increase in the costs. In order to cover the loss of the light volume by the increase in the number of reflection, it is necessary to increase the light volume of the light source 32'. However, by the increase in the light volume of the light source 32', the power consumption and the temperature are increased.

Figure 9:
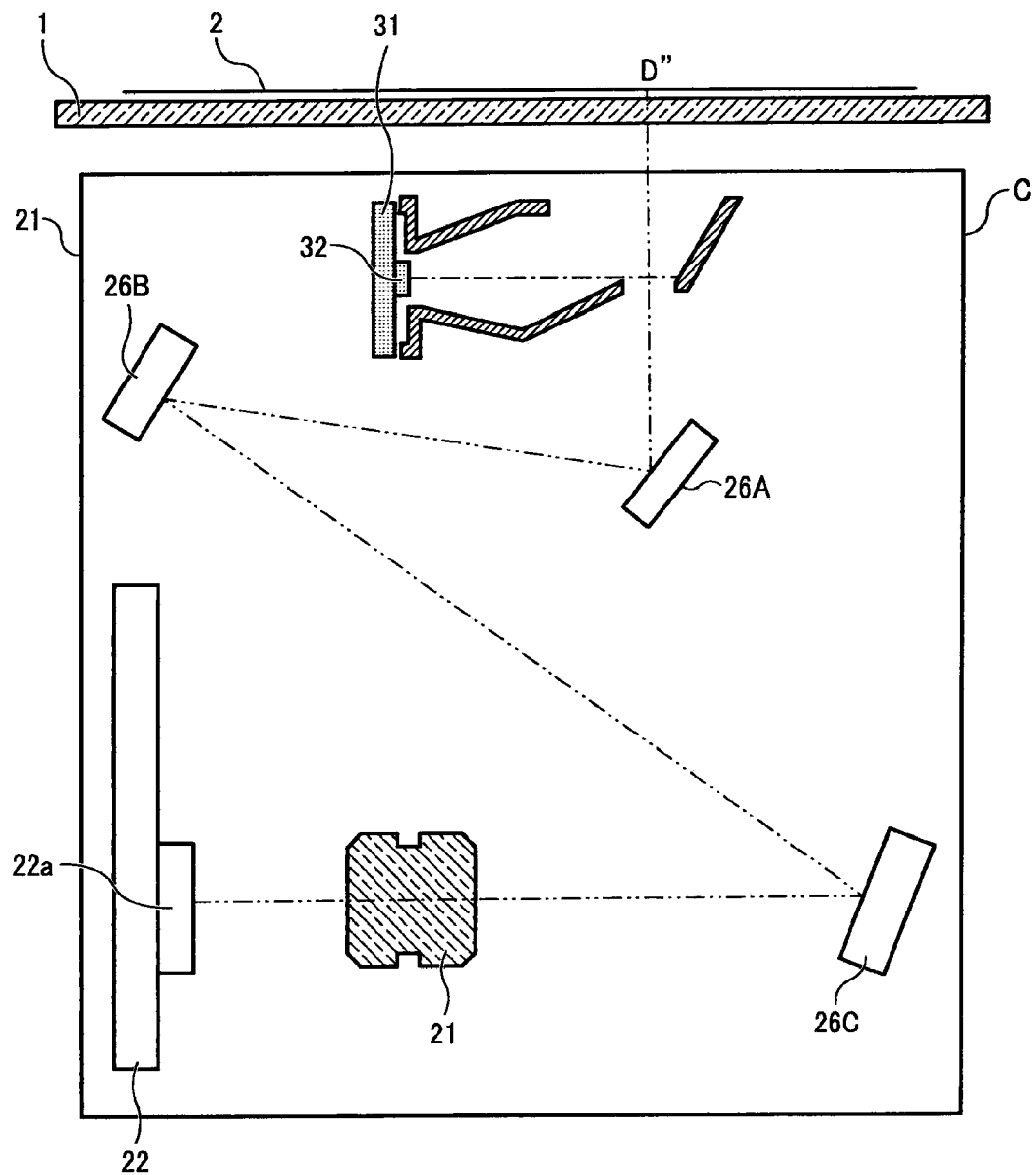
FIG. 9 provides a sectional view schematically illustrating another example of an unfavorable structure of an optical reader.

As illustrated in FIG. 9, if the optical path is deflected by the three reflection mirrors 26A, 26B, 26C which are disposed to avoid the space between the original document reading position D" and the end portion C of the optical reader, the space becomes a dead space, resulting in the increase in the entire size of the optical reader.

Figure 2:
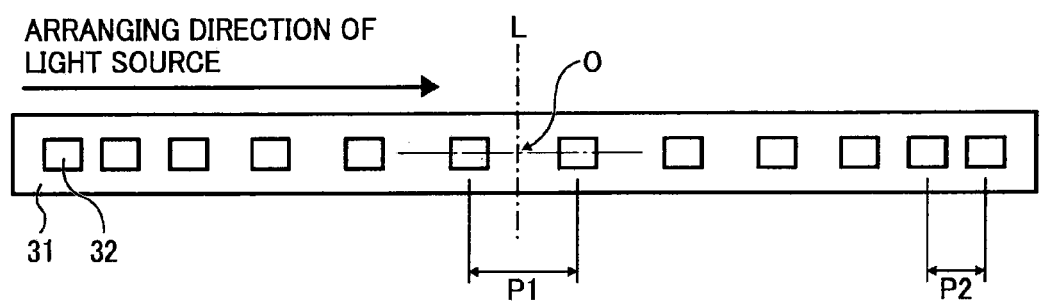
FIG. 2 provides a view schematically illustrating one embodiment of a light source unit for use in the optical reader in FIG. 1.
Figure 3:
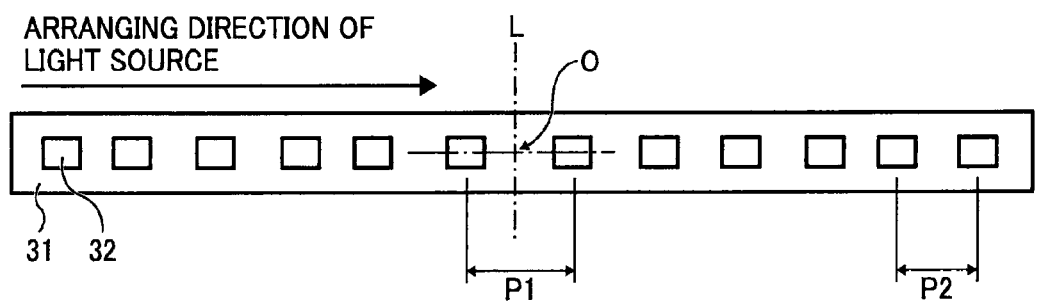
FIG. 3 provides a view schematically illustrating another embodiment of the light source unit for use in the optical reader in FIG. 1.

FIGS. 2, 3 illustrate a detailed structure of the light source unit according to the embodiment of the present invention. A plurality of light sources 32 is arranged in the substrate 31. An LED or the like which has small power consumption, small heat generation, a long operating life, and an advantage from an environmental aspect regarding recycling and the like is suitable for the light source 32.

In this case, as the embodiment illustrated in FIG. 2, when the position of the original surface corresponding to the optical axis L of the focusing lens 21 is a center O, a pitch P2 of the light sources 32 in the periphery of the original document surface is reduced to a pitch P1 of the light sources 32 in the center O. Consequently, illumination light volume distribution which corrects the decrease in the light volume in the periphery of the focusing lens 21 according to cosign fourth law can be obtained.

As described in another embodiment illustrated in FIG. 3, the same pitch is used from the central pitch P1 to the peripheral pitch P2, so that the light source unit in which the light volume is uniformly distributed on the original document surface may be obtained. Similarly, by varying the pitch of each light source 32, the illumination intensity distribution in the arrangement direction of the light sources 32 can be freely set.

When the normal line K of the emission surface of the light source 32 is not parallel to the optical axis L of the focusing lens 21, the mechanical vignetting by the illumination unit 30 may occur when deflecting the reflection light from the original document 2. As illustrated especially in FIG. 7, if the length of the illumination unit 30 in the direction of the optical axis L is increased, the mechanical vignetting by the illumination unit 30 may easily occur.

According to the embodiment of the present invention, the optical reader 20 which reads an image of an original document can be downsized, the miss-focusing by heat generation can be controlled, and the uneven illumination can be reduced. Consequently, a preferable image of an original document can be read.

Figure 4:
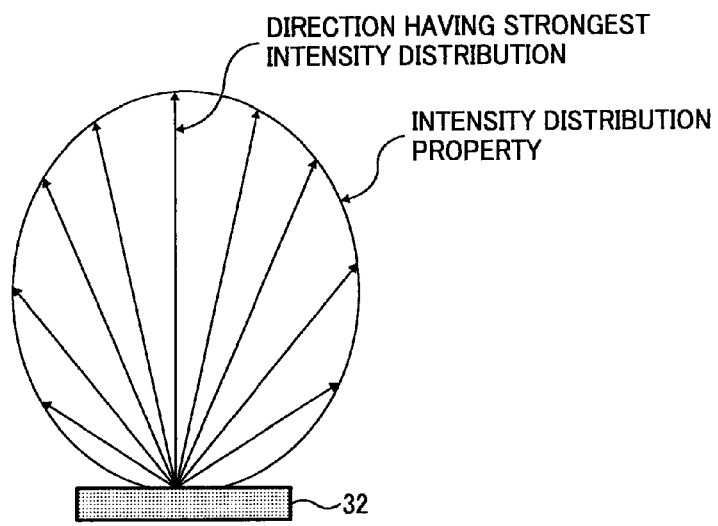
FIG. 4 provides a view schematically illustrating a light distribution feature (directional characteristic) of the light source according to the optical reader in FIG. 1.
Figure 5:
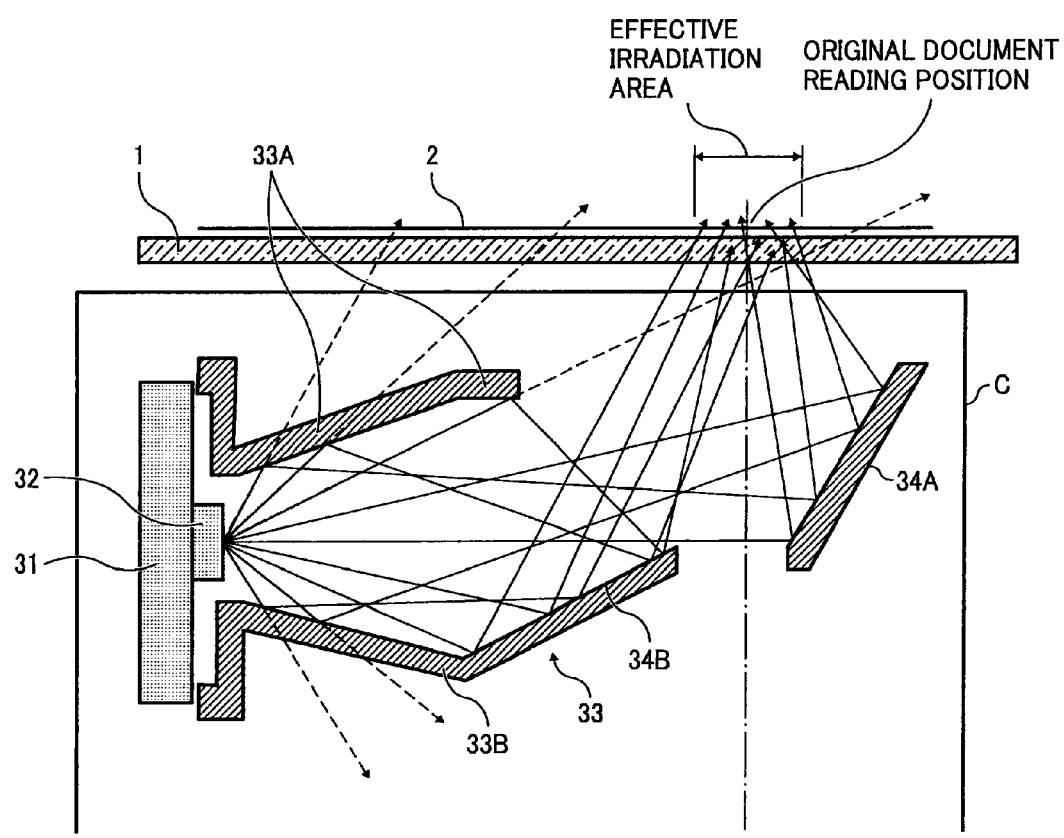
FIG. 5 provides a sectional view schematically illustrating a detailed structure of an illumination unit of the optical reader in FIG. 1.

The light source 32 such as an LED includes a light distribution property illustrated in FIG. 4 having an angular dependency from an emission part of the light source 32 to the front, i.e., a directional characteristic. When using such a light source 32, as illustrated in FIG. 5, the illumination light from the light source 32 irradiates outside the reading area of the surface of the original document 2 as illustrated by the dotted lines if the diffusion control section 33 (33A, 33B) is not disposed, resulting in the generation of flare and ghost, and the decrease in the illumination efficiency. For this reason, in order to control the diffusion of the illumination light from the light source 32, the diffusion control section 33 having the upper first diffusion control part 33A and the lower second diffusion control part 33B is disposed, such that the light source 32 is arranged therebetween.

Moreover, the reflection section 34 which reflects the illumination light to the direction irradiating the original document 2 is disposed between (near) the original document reading position D and the end portion C of the optical reader. As described above, the reflection section 34 includes the first reflection part 34A which reflects the illumination light in the direction of the original document and the second reflection part 34B disposed in the light source 32 side of the original document reading position D. The second diffusion control part 33B and the second reflection part 34B are disposed close to each other, so that they can be constituted as one component as illustrated in FIG. 5.

By constituting the illumination unit 30 as described above, the surface of the original document is irradiated by the reflection light from the reflection parts 34A, 34B without being directly irradiated from the light source 32. For this reason, the distance from the light source 32 to the surface of the original document 2 can be increased, and the uneven illumination of the light source 32 in the arrangement direction can be reduced even if the small number of light sources is used. Since the surface of the original document is irradiated from both sides of the front and back in the optical axis L direction of the light source 32 in the original document reading position D, the generation of the shadow by a cut-and-paste original document and the like can be prevented.

Figure 6:
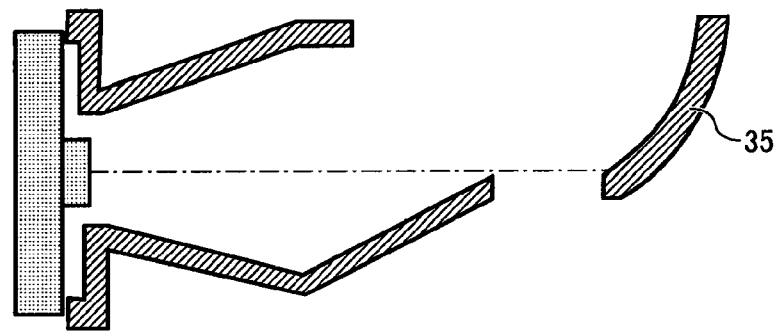
FIG. 6 provides a sectional view schematically illustrating another structure of a reflection unit in the illumination unit of the optical reader in FIG. 1.

The reflection section 34 (34A, 34B) can be formed by a flat surface or a curved surface. FIG. 6 illustrates a reflection section 35 having a curved reflection surface as the reflection part disposed between the original document reading position D and the end portion C of the optical reader. In addition, all reflection surfaces of the reflection parts can be curved surfaces.

Moreover, a reflection surface such as a curved surface which curves only in the short direction of the reflection part, i.e., a cylinder surface can be used for the reflection section. By using such a reflection surface, the illumination light can be collected in the sub-scanning direction, so that the illumination efficiency can be improved.

As described above, in the present embodiment, since the diffusion control section 33 is disposed in the illumination section 30, the emission light from the light source 32 can be effectively guided to the reflection surface. Since the distance from the light source 32 to the original document reading surface can be increased, the uneven illumination on the original document surface by the arrangement intervals of the light sources 32 can be reduced. Therefore, the illumination light having highly-effective light use can be obtained. Since the original document surface can be illuminated from the two directions, a difference in the ratio among the shadow line generated in the gap between the end portion of the original document and the pressure plate which presses the original document, the shadow line generated when illuminating from the second original document side to the first original document side, and the shadow line generated when illuminating from the first original document side to the second original document side, relative to the gap between the first original document to be pasted and the second original document in which the first original document is pasted in the cut-and-paste original document can be reduced. Accordingly, the original document can be preferably read.

In order to reduce the thickness of the optical reader and to downsize the optical reader, it is necessary to effectively deflect the reflection light from the original document as much as possible. In the optical reader according to the embodiment of the present invention, the original document reading position D is disposed near the end portion C of the optical reader in the emission direction A of the light source 32 and the normal direction B of the light-receiving surface 22a of the photoelectric conversion element 22 in the optical reader 20. Therefore, the space above the focusing lens 21 and the photoelectric conversion element 22 can be effectively used, and the optical path can be effectively deflected.

As illustrated in FIG. 1, when the length of the illumination section 30 in the direction A is short, a space is formed above the focusing lens 21 and the photoelectric conversion element 22. By disposing the reflection mirror 23B in the space, the optical path can be effectively deflected.

In addition, in the present embodiment, the original reading position D is disposed near the end portion C of the reader, and the second reflection mirror 23B is disposed at the upper left in FIG. 1. By this structure, the optical path from the first reflection mirror 23A to the second reflection mirror 23B has an angle relative to the normal direction of the emission surface of the light source 32. Therefore, in the optical reader, the space efficiency can be improved and the size can be reduced while ensuring a predetermined distance of the optical path.

Figure 7:
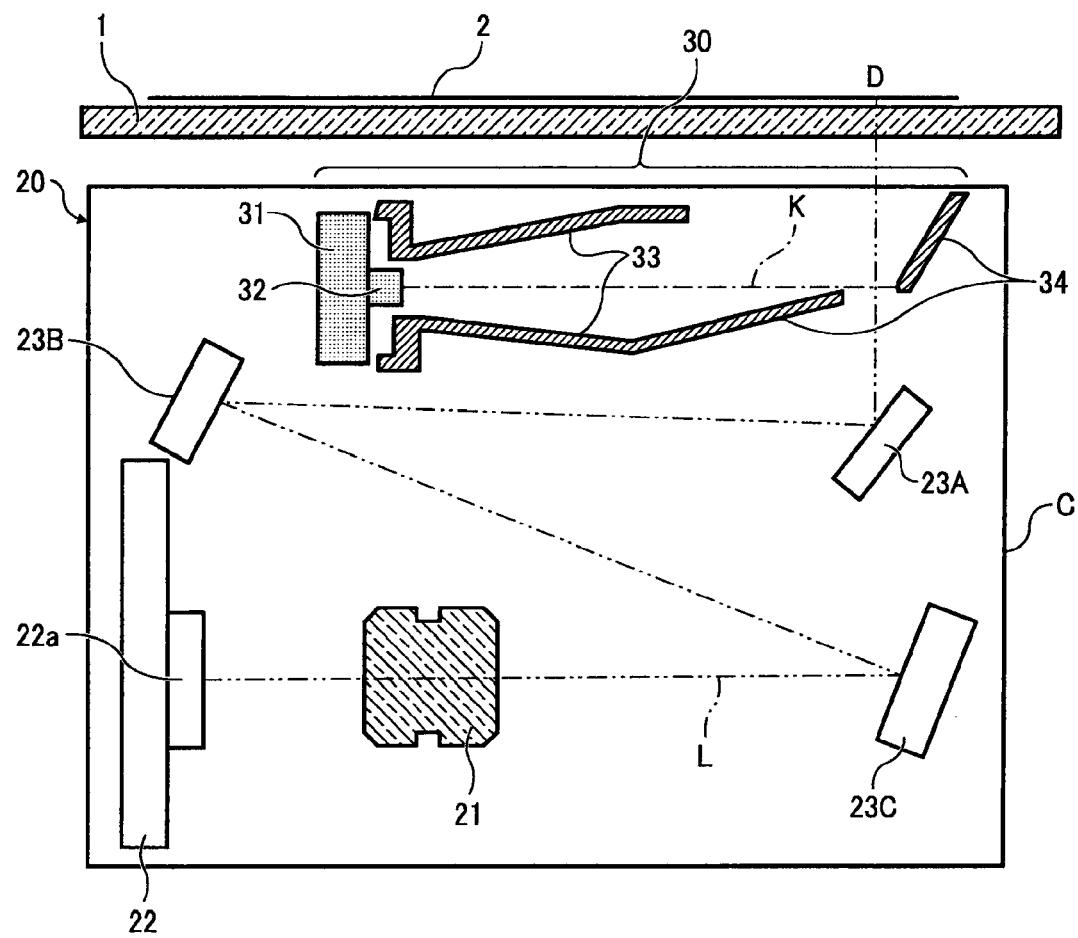
FIG. 7 provides a sectional view schematically illustrating one example when the length of the illumination unit of the optical reader of FIG. 1 in the optical axis direction is long.

As illustrated in FIG. 7, even though the length of the illumination section 30 in the direction A is relatively long, the optical path can be arranged in the full width of the optical reader 20 in the normal direction of the light-receiving surface 22a of the photoelectric conversion element 22 by disposing the reflection mirror 23B above the focusing lens 21 and the photoelectric conversion element 22. Accordingly, the optical path can be effectively deflected by using the small number of reflection mirrors 23.

As described above, the reflection efficiency of the reflection light from the original document can be improved, and the number of reflection times can be reduced. Therefore, the decrease in the light volume by the reflection can be minimized, and the heat generation and the power consumption by the illumination can be further controlled. Also, the optical reading unit can be further downsized.

According to the embodiment of the present invention, an image reader including the above optical reader can be obtained. Such an image reader uses the optical reader including the above illumination unit, so that the image reader having low power consumption, small heat generation, a long operating life and a good environmental performance regarding recycling can be obtained, and a preferable reading quality can be also obtained. Accordingly, the power consumption and the heat generation of the image reader can be reduced, the operating life of the device can be increased, and the device can correspond to recycling.

By providing a section having a color separation function in an optical path of the reduced focusing optical system in the above optical reader, full-color information of an original document can be read.

Various structures can be used for the section having a color separation function, such as a structure having a color separation prism between the focusing lens and the photoelectric conversion element, a structure separating into each color R, G, B by selectively inserting a filter, a structure illuminating an original document by selectively lighting each light source R, G, B, and a structure separating into three primary colors by using a three-line sensor such as a three-line CCD in which light receiving sources of photoelectric conversion elements having R, G, B filters are arranged in one chip so as to focus a color image on the light receiving surfaces.

Figure 11:
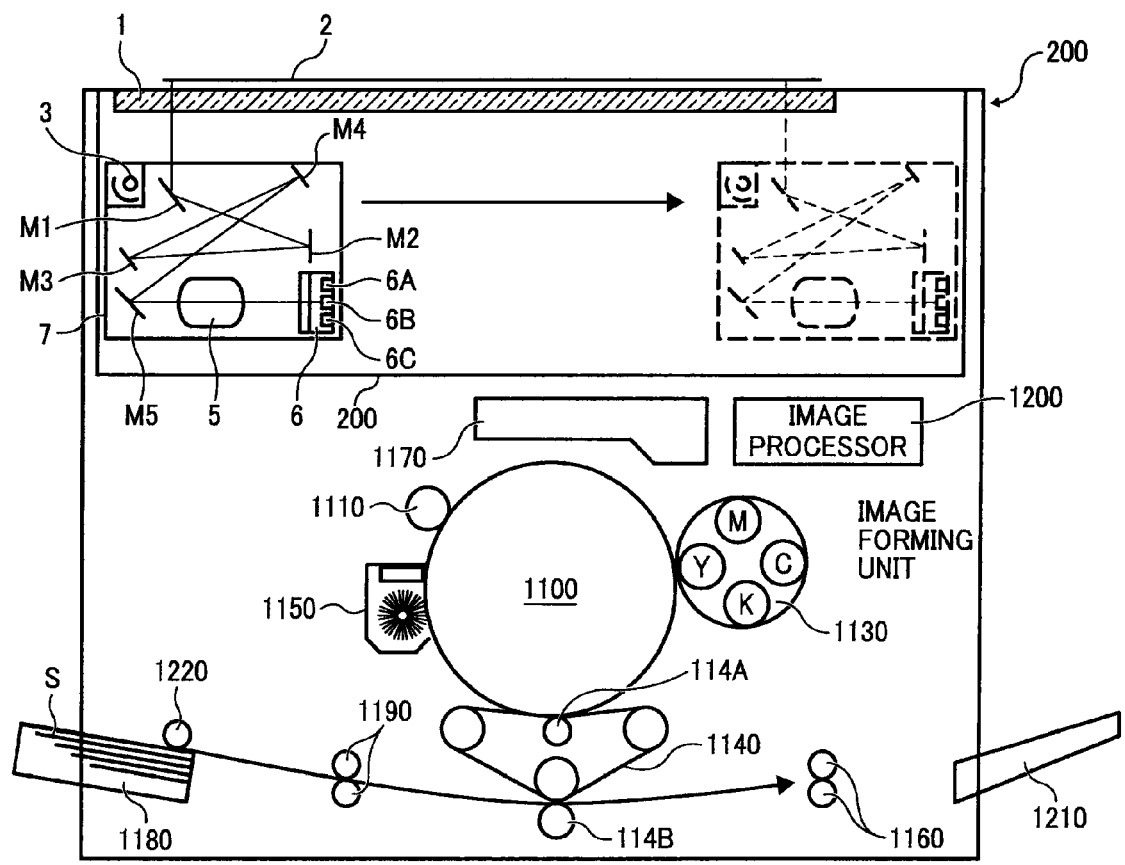
FIG. 11 provides a sectional view schematically illustrating one example of a general image forming device having the optical reader in FIG. 10.
Figure 12:
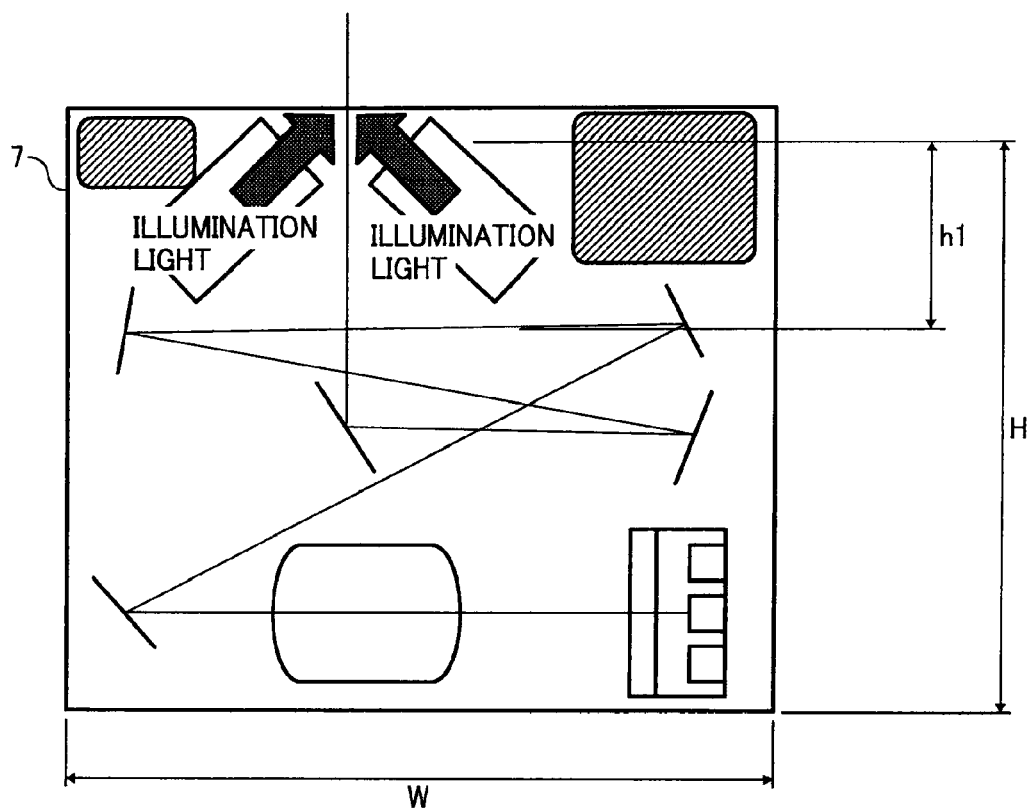
FIG. 12 provides a sectional view describing a problem in an optical reader.
Figure 13:
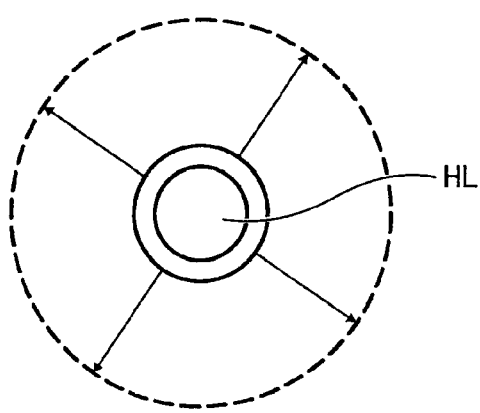
FIG. 13 provides a view illustrating an emission distribution of a halogen lamp used as a light source in the conventional optical reader.
Figure 14:
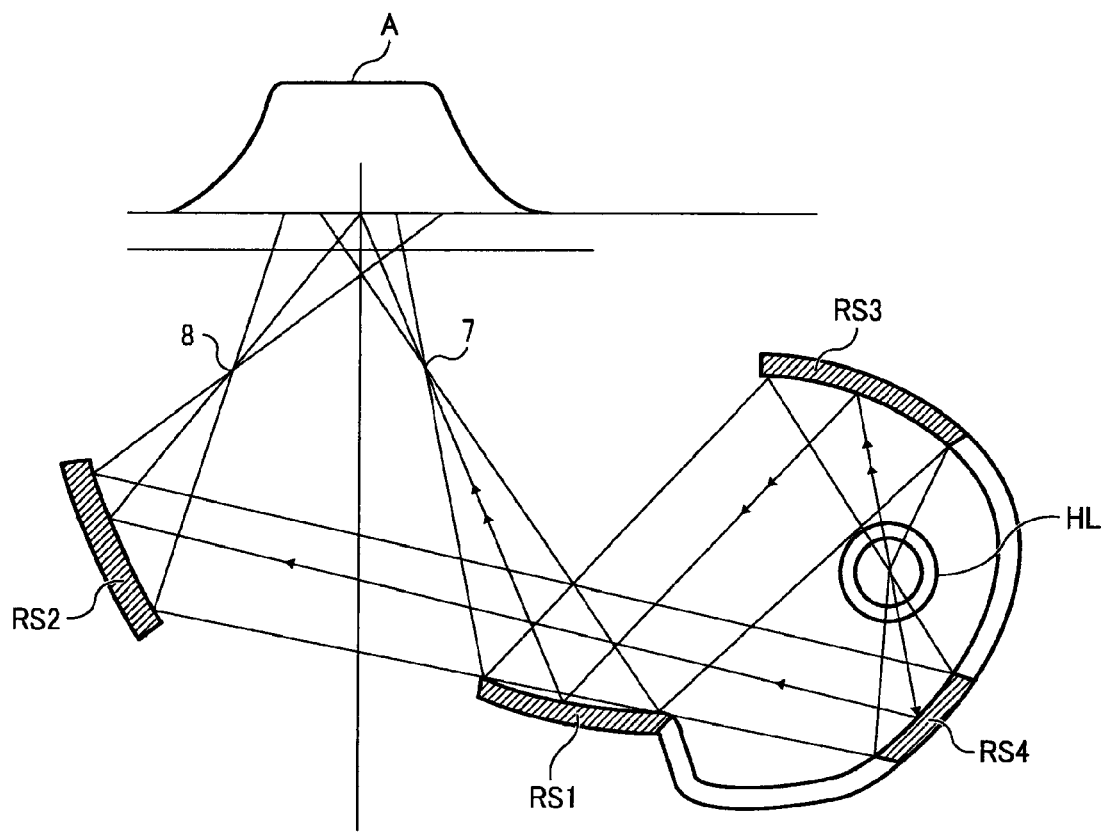
FIG. 14 provides a view describing a problem in the illumination unit using the halogen lamp in FIG. 13.

An image forming device corresponding to the image forming device illustrated in FIG. 11 can be constituted by using the above-described image reader. By introducing such an image reader in the image forming device illustrated in FIG. 11, the image forming device having low power consumption, small heat generation, a long operating life and a good environmental performance can be obtained, and a preferable image an be formed.

As described above, according to the embodiment of the present invention, the optical reader, which can control an abnormal image caused by the gap on the original document surface, miss-focusing by heat generation, and uneven illumination, achieve preferable image reading, the downsizing of the device structure, and highly-effective light use, contribute space saving, energy saving, and environmental conservation, can be provided.

According to the embodiment of the present invention, the optical reader, which can reduce the uneven illumination on the original document surface to obtain the illumination light having highly-effective light use by effectively guiding the emission light of the light source to the reflection surface and increasing the distance from the light source to the original document reading surface, and reduce the shadow caused by the gap in the pasted portion in the cut-and-paste original document and the gap between the original document and the periphery of the original document to preferably read an original document, can be provided.

According to the embodiment of the present invention, the optical reader, which can reduce the number of reflection times by improving the reflection efficiency of the reflection light from the original document to minimize the decrease in the light volume caused by the reflection, and also control the heat generation and power consumption to further downsize the device, can be provided.

According to the embodiment of the present invention, the image reader, which can achieve lower power consumption, small heat generation, a long operating life and recycling, can be provided.

According to the embodiment of the present invention, the image reader, which can read a full color image, and can achieve lower power consumption, small heat generation, a long operating life and recycling, can be provided.

According to the embodiment of the present invention, the image forming device, which can achieve low power consumption, small heat generation, a long operating life and recycling, can be provided.

As described above, although the present invention has been described in terms of the embodiment, it is not limited thereto. It should be appreciated that variations may be made in the embodiment described by persons skilled in the art without departing from the scope of the present invention as defined by the following claims.

What is claimed is:

1. An optical reader which reads image information on an original document by moving to the original document, comprising:
   an illumination unit having at least one light source arranged on a substrate and illuminating the original document;
   a first minor reflecting reflection light from the original document;
   a second mirror reflecting reflection light from the first mirror;
   a focusing lens focusing the reflection light from the original document reflected by the second mirror; and
   a photoelectric conversion element arranged in a focusing position of the focusing lens,
   wherein a normal direction of an emission surface of the light source and a normal direction of a light-receiving surface of the photoelectric conversion element are the same direction,
   an original document reading position is set near an end portion of the optical reader in the normal direction,
   a reflection section reflecting illumination light in a surface direction of the original document is disposed between the original document reading position and the end portion of the optical reader in the normal direction of the light emission surface of the light source,
   an optical path from the first mirror to the second mirror has an angle relative to the normal direction of the emission surface of the light source, and
   a diffusion control section controlling diffusion of the illumination light from the light source is disposed on both sides of the light source in an up and down direction orthogonal to the arrangement direction of the light source.

2. The optical reader according to claim 1, wherein a normal line of the emission surface of the light source and an optical axis of the focusing lens are substantially parallel to each other.

3. The optical reader according to claim 1, wherein the first and second mirrors guiding the reflection light from the surface of the original document are disposed between an optical path from the focusing lens to the photoelectric conversion element and the surface of the original document.

4. The optical reader according to claim 2, wherein the first and second mirrors guiding the reflection light from the surface of the original document are disposed between an optical path from the focusing lens to the photoelectric conversion element and the surface of the original document.

5. An image reader, comprising: the optical reader according to claim 1, wherein the original document is read by the optical reader.

6. An image reader, comprising: the optical reader according to claim 2, wherein the original document is read by the optical reader.

7. An image reader, comprising: the optical reader according to claim 3, wherein the original document is read by the optical reader.

8. The image reader according to claim 5, wherein a color separation section having a color separation function is disposed in an arbitrary position in the optical path of the optical reader, and full-color information of the original document is read by using the color separation section.

9. The image reader according to claim 6, wherein a color separation section having a color separation function is disposed in an arbitrary position in the optical path of the optical reader, and full-color information of the original document is read by using the color separation section.

10. The image reader according to claim 2, wherein a color separation section having a color separation function is disposed in an arbitrary position in the optical path of the optical reader, and full-color information of the original document is read by using the color separation section.

11. The image reader according to claim 7, wherein a color separation section having a color separation function is disposed in an arbitrary position in the optical path of the optical reader, and full-color information of the original document is read by using the color separation section.

12. An image forming device, comprising: the image reader according to claim 5, wherein an image read by the image reader is formed.

13. An image forming device, comprising: the image reader according to claim 6, wherein an image read by the image reader is formed.

14. An image forming device, comprising: the image reader according to claim 8, wherein an image read by the image reader is formed.

* * * * *